United States Patent
Fukushima

(10) Patent No.: US 11,858,344 B2
(45) Date of Patent: Jan. 2, 2024

(54) VEHICLE AND CONTROL METHOD THEREOF

(71) Applicant: YAMAHA HATSUDOKI KABUSHIKI KAISHA, Iwata (JP)

(72) Inventor: Kenji Fukushima, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 676 days.

(21) Appl. No.: 17/070,981

(22) Filed: Oct. 15, 2020

(65) Prior Publication Data

US 2021/0023942 A1 Jan. 28, 2021

Related U.S. Application Data

(62) Division of application No. 15/662,369, filed on Jul. 28, 2017.

(30) Foreign Application Priority Data

Aug. 17, 2016 (JP) .................. 2016-160051

(51) Int. Cl.
B60K 17/16 (2006.01)
B60W 30/18 (2012.01)
(Continued)

(52) U.S. Cl.
CPC ............... B60K 17/20 (2013.01); B60K 5/02 (2013.01); B60K 17/16 (2013.01); B60K 17/165 (2013.01);
(Continued)

(58) Field of Classification Search
CPC .... B60W 10/02; B60W 10/16; B60W 30/045; B60W 30/18027; B60W 30/18172; B60W 2510/0208; B60W 2510/0241; B60W 2510/1005; B60W 2540/10; B60W 2710/02; B60W 2710/021; B60W 2710/023; B60W 2710/027; B60W 2710/0644; B60W 2710/125; B60K 17/16; B60K 17/165; B60K 17/20; B60K 17/344; B60K 23/04; B60K 2023/043; B60K 2023/046; B60Y 2300/84; B60Y 2400/802

See application file for complete search history.

(56) References Cited

U.S. PATENT DOCUMENTS 4,768,399 A * 9/1988 Kubo ................... B60K 17/346
475/249
4,832,145 A * 5/1989 Fujii ...................... B60T 8/322
303/190

(Continued)

OTHER PUBLICATIONS

Fukushima, "Vehicle and Control Method Thereof", U.S. Appl. No. 15/662,369, filed Jul. 28, 2017.

*Primary Examiner* — Kevin Hurley
(74) *Attorney, Agent, or Firm* — Keating & Bennett, LLP

(57) ABSTRACT

A vehicle includes a differential gear that transmits rotation of a propeller shaft to an axle. A differential lock switches the differential gear between a locked state and an unlocked state. A clutch is provided in a power transmission path between a prime mover and wheels of the vehicle. A controller controls an engaging force of the clutch during a moving start of the vehicle in accordance with which of the locked state and the unlocked state is selected by the differential gear.

13 Claims, 14 Drawing Sheets

(51) Int. Cl.
*B60W 30/182* (2020.01)
*B60K 17/344* (2006.01)
*B60K 5/02* (2006.01)
*B60K 17/30* (2006.01)
*B60K 23/04* (2006.01)
*B60K 23/08* (2006.01)
*B60N 2/01* (2006.01)
*B60W 10/02* (2006.01)
*B60W 10/06* (2006.01)
*B60W 10/16* (2012.01)
*B60W 30/045* (2012.01)
*B62D 1/04* (2006.01)
*B60K 5/00* (2006.01)
*F16H 48/32* (2012.01)
*B60R 21/13* (2006.01)
*F16H 48/24* (2006.01)

(52) U.S. Cl.
CPC ........... *B60K 17/30* (2013.01); *B60K 17/344* (2013.01); *B60K 23/04* (2013.01); *B60K 23/08* (2013.01); *B60N 2/01* (2013.01); *B60W 10/02* (2013.01); *B60W 10/06* (2013.01); *B60W 10/16* (2013.01); *B60W 30/045* (2013.01); *B60W 30/182* (2013.01); *B60W 30/18027* (2013.01); *B60W 30/18172* (2013.01); *B62D 1/04* (2013.01); *B60K 2005/003* (2013.01); *B60K 2005/006* (2013.01); *B60K 2023/043* (2013.01); *B60K 2023/046* (2013.01); *B60K 2023/085* (2013.01); *B60R 21/13* (2013.01); *B60W 2300/362* (2013.01); *B60W 2510/0208* (2013.01); *B60W 2510/0241* (2013.01); *B60W 2510/10* (2013.01); *B60W 2510/1005* (2013.01); *B60W 2510/125* (2013.01); *B60W 2540/10* (2013.01); *B60W 2710/02* (2013.01); *B60W 2710/021* (2013.01); *B60W 2710/023* (2013.01); *B60W 2710/027* (2013.01); *B60W 2710/0644* (2013.01); *B60W 2710/125* (2013.01); *B60Y 2200/124* (2013.01); *B60Y 2200/20* (2013.01); *B60Y 2300/421* (2013.01); *B60Y 2300/84* (2013.01); *B60Y 2400/802* (2013.01); *F16H 48/24* (2013.01); *F16H 48/32* (2013.01)

(56) References Cited

U.S. PATENT DOCUMENTS

| | | | | |
|---|---|---|---|---|
| 5,265,018 | A * | 11/1993 | Sokol | F16H 61/702 701/52 |
| 6,976,553 | B1 * | 12/2005 | Dahl | B60K 23/08 180/247 |
| 10,850,612 | B2 * | 12/2020 | Fukushima | B60K 17/30 |
| 2001/0004031 | A1 * | 6/2001 | Hasegawa | B60K 17/34 180/400 |
| 2002/0137589 | A1 * | 9/2002 | Banno | B60K 17/3462 180/247 |
| 2004/0254039 | A1 * | 12/2004 | Yasui | B60W 10/06 903/910 |
| 2005/0071065 | A1 * | 3/2005 | Zimmermann | B60W 30/18027 701/54 |
| 2005/0221953 | A1 * | 10/2005 | Okabe | F16H 61/0213 477/120 |
| 2006/0272875 | A1 * | 12/2006 | Matsuda | B62M 7/00 180/197 |
| 2008/0090688 | A1 * | 4/2008 | Torres | B60K 17/20 475/35 |
| 2008/0188348 | A1 * | 8/2008 | Kumazaki | B60W 20/30 701/54 |
| 2009/0156359 | A1 * | 6/2009 | Tabata | F16H 61/0437 477/108 |
| 2014/0141935 | A1 * | 5/2014 | Huff | B60W 30/186 477/174 |
| 2014/0336001 | A1 * | 11/2014 | Imafuku | B60K 23/08 477/35 |
| 2015/0073679 | A1 * | 3/2015 | Darnell | B60W 30/18172 701/84 |
| 2015/0197145 | A1 * | 7/2015 | Kochidomari | B60K 17/043 180/243 |
| 2016/0101690 | A1 * | 4/2016 | Imafuku | B60K 17/344 74/665 G |
| 2016/0167666 | A1 * | 6/2016 | Oohata | B60W 30/19 477/166 |
| 2016/0194001 | A1 * | 7/2016 | Kelly | B60K 28/165 701/41 |
| 2016/0339960 | A1 * | 11/2016 | Leonard | B60K 17/16 |
| 2017/0002920 | A1 * | 1/2017 | Bessho | F16H 57/027 |
| 2017/0050516 | A1 * | 2/2017 | Imafuku | B60K 23/0808 |
| 2017/0089439 | A1 * | 3/2017 | Monticello | F16H 48/22 |

* cited by examiner

VEHICLE AND CONTROL METHOD THEREOF

CROSS REFERENCE TO RELATED APPLICATIONS

This application claims the benefit of priority to Japanese Patent Application No. 2016-160051 filed on Aug. 17, 2016. The entire contents of this application are hereby incorporated herein by reference.

BACKGROUND OF THE INVENTION

1. Field of the Invention

The present invention relates to a vehicle and a control method thereof.

2. Description of the Related Art

Vehicles such as a recreational off-highway vehicle (ROV) are likely to travel on unpaved roads of sandy terrain, rough terrain and so forth. In such a situation, the wheels are likely to slip. However, when a vehicle includes a clutch that transmits/blocks transmission of a driving force, moving start control to get out of a slip state is enabled by controlling the clutch.

For example, a leisure vehicle disclosed in Japan Laid-open Patent Application Publication No. 2006-329118 includes a control device that executes control to accelerate drive wheels while keeping the drive wheels from slipping beyond a predetermined state. The control device does not execute the aforementioned control when the rotational state of the drive wheels is greater than or equal to a predetermined value. Therefore, according to Japan Laid-open Patent Application Publication No. 2006-329118, it is possible to obtain, with a simple configuration, a leisure vehicle that does not slip beyond the predetermined state during a moving start or during acceleration.

On the other hand, Japan Laid-open Patent Application Publication No. 2009-078713 discloses a vehicle that executes a moving start control in response to a paddle operation. Therefore, according to Japan Laid-open Patent Application Publication No. 2009-078713, a driver or rider can execute a moving start operation without taking his/her hands off a steering wheel.

Incidentally, a differential gear is generally switchable between a locked state and an unlocked state in a vehicle that travels on unpaved roads, and a driver or rider generally executes switching between these states in accordance with a traveling condition. For example, there is a situation that during occurrence of slipping on a badly conditioned road, a vehicle gets out of the state of slipping by eliminating spinning of right and left wheels with the use of a differential lock. Alternatively, a vehicle can quickly move on a badly conditioned road with the use of a moving start control to increase a driving force during a moving start of the vehicle.

However, the following drawback occurs during combined use of the moving start control and switching between the locked state and the unlocked state by the differential lock.

First, the wheels are unlikely to spin in the locked state of the differential gear. Because of this, when the vehicle travels at a high velocity during the moving start control in the locked state of the differential gear, a strong reaction (kickback) inevitably acts on the vehicle from the road surface. On the other hand, when the differential lock is not firmly engaged, the locked state is possibly switched into the unlocked-state or vice versa during the moving start of the vehicle. This is not preferable as a behavior during the moving start control.

Second, there is a difference in the performance required for a moving start of a vehicle between two situations: the vehicle is able to get out of a badly conditioned road; and the vehicle accelerates fast on flat terrain. For example, a strong driving force is instantaneously required in the situation that the vehicle gets out of a badly conditioned road in comparison with the situation that the vehicle accelerates fast on flat terrain.

On the other hand, in some vehicles, a high gear and a low gear are selectable. In such a vehicle, there is a large difference in the gear ratio between the high gear and the low gear. Due to this, when the moving start control is executed while the low gear is selected, for instance, an excessive driving force can be generated. In this case, even when such a large driving force is obtained by the moving start control, a drawback occurs in that the vehicle cannot run fast because wheels dig into the earth and sand too much.

SUMMARY OF THE INVENTION

Preferred embodiments of the present invention execute a moving start control for a vehicle in accordance with which one of a locked state and an unlocked state is selected by a differential gear. Further preferred embodiments of the present invention execute a moving start control for a vehicle in accordance with which of a low gear and a high gear is selected.

A vehicle according to a preferred embodiment of the present invention includes a prime mover, a pair of right and left wheels, a propeller shaft, an axle, a differential gear, a differential lock, a clutch and a controller. The propeller shaft transmits a driving force of the prime mover. The axle is coupled to the pair of right and left wheels. The differential gear transmits rotation of the propeller shaft to the axle. The differential lock switches the differential gear between a locked state and an unlocked state. The clutch is provided in a power transmission path between the prime mover and the pair of right and left wheels. The controller is configured or programmed to control an engaging force of the clutch during a moving start of the vehicle in accordance with which of the locked state and the unlocked state is selected by the differential gear.

A vehicle according to another preferred embodiment of the present invention includes a prime mover, a pair of right and left wheels, a transmission, a clutch and a controller. The clutch is provided in a power transmission path between the prime mover and the pair of right and left wheels. The transmission includes at least a high gear and a low gear, and transmits a driving force of the prime mover to the pair of right and left wheels. The controller is configured or programmed to execute a moving start control to increase the driving force during a moving start of the vehicle to be greater than that in a normal mode in which the moving start control is not executed by controlling an engaging force of the clutch. The controller is further configured or programmed to control the engaging force of the clutch during a moving start of the vehicle in accordance with which of the high gear and the low gear is selected in the transmission.

A control method according to another preferred embodiment of the present invention includes a method of controlling a vehicle. The vehicle includes a differential gear that transmits rotation of a propeller shaft to an axle coupled to a pair of right and left wheels. The propeller shaft transmits a driving force of a prime mover. The control method includes the following steps. In the first step, it is determined which of a locked state and an unlocked state is selected by the differential gear. In the second step, controlling an engaging force of a clutch during a moving start of the vehicle in accordance with which of the locked state and the unlocked state is selected. The clutch is provided in a power transmission path between the prime mover and the pair of right and left wheels.

A control method according to another preferred embodiment of the present invention includes a method of controlling a vehicle. The vehicle includes a transmission that includes at least a high gear and a low gear and transmits a driving force of a prime mover to a pair of right and left wheels. The control method includes the following steps. In the first step, it is determined which of the high gear and the low gear is selected in the transmission. In the second step, a moving start control is executed to increase the driving force during a moving start of the vehicle to be greater than that in a normal mode in which the moving start control is not executed by controlling an engaging force of a clutch. The clutch is provided in a power transmission path between the prime mover and the pair of right and left wheels. In the third step, the engaging force of the clutch during a moving start of the vehicle is controlled in accordance with which of the high gear and the low gear is selected.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
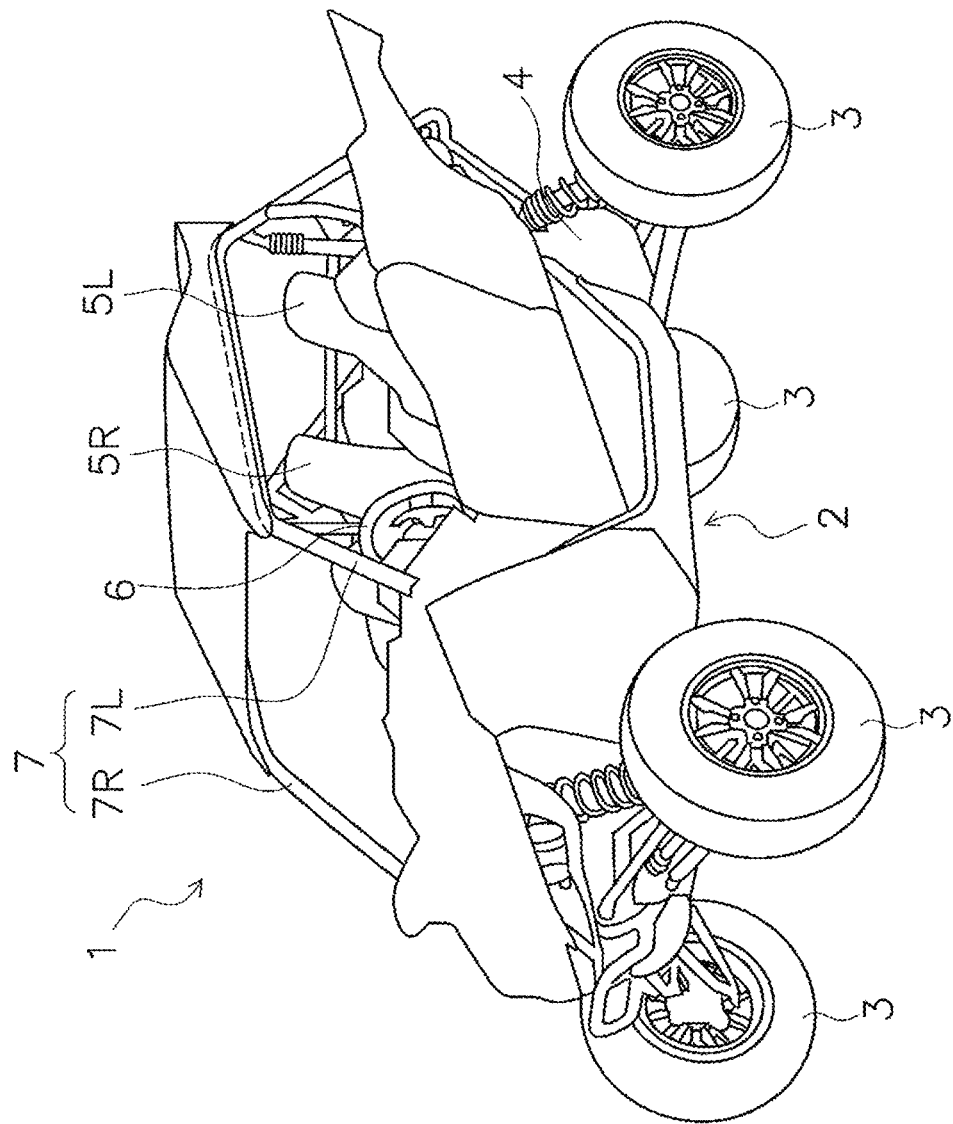
FIG. 1 is a perspective view of a vehicle according to a preferred embodiment of the present invention.

Vehicles according to preferred embodiments of the present invention will be hereinafter explained in detail with reference to attached drawings. FIG. 1 is a perspective view of a vehicle 1 according to the present preferred embodiment. The vehicle 1 according to the present preferred embodiment is, for example, a so-called ROV that is suitable for traveling on rough terrain.

As shown in FIG. 1, the vehicle 1 includes a vehicle body 2 and a plurality of wheels 3. The vehicle 1 includes, for example, four wheels. More specifically, the vehicle 1 preferably includes two front wheels and two rear wheels, for example. It should be noted that the number of wheels is not limited to four and may be greater than four. The vehicle body 2 includes a prime mover 4 and seats 5L and 5R. The prime mover 4 is disposed behind the seats 5R and 5L.

The seats 5R and 5L are preferably seats disposed in a side-by-side arrangement, for example, and include a right seat 5R and a left seat 5L. A steering wheel 6 is disposed in front of the left seat 5L. A roll cage 7 is disposed above the seats 5R and 5L. The roll cage 7 includes right and left roll cages 7R and 7L. The left roll cage 7L extends from a position forward of the left seat 5L to a position rearward of the left seat 5L through a position above the left seat 5L. The right roll cage 7R extends from a position forward of the right seat 5R to a position rearward of the right seat 5R through a position above the right seat 5R.

It should be noted that the steering wheel 6 may be disposed in front of the right seat 5R. The roll cage 7 may be disposed to extend in a right-and-left direction of the vehicle body 2.

Figure 2:
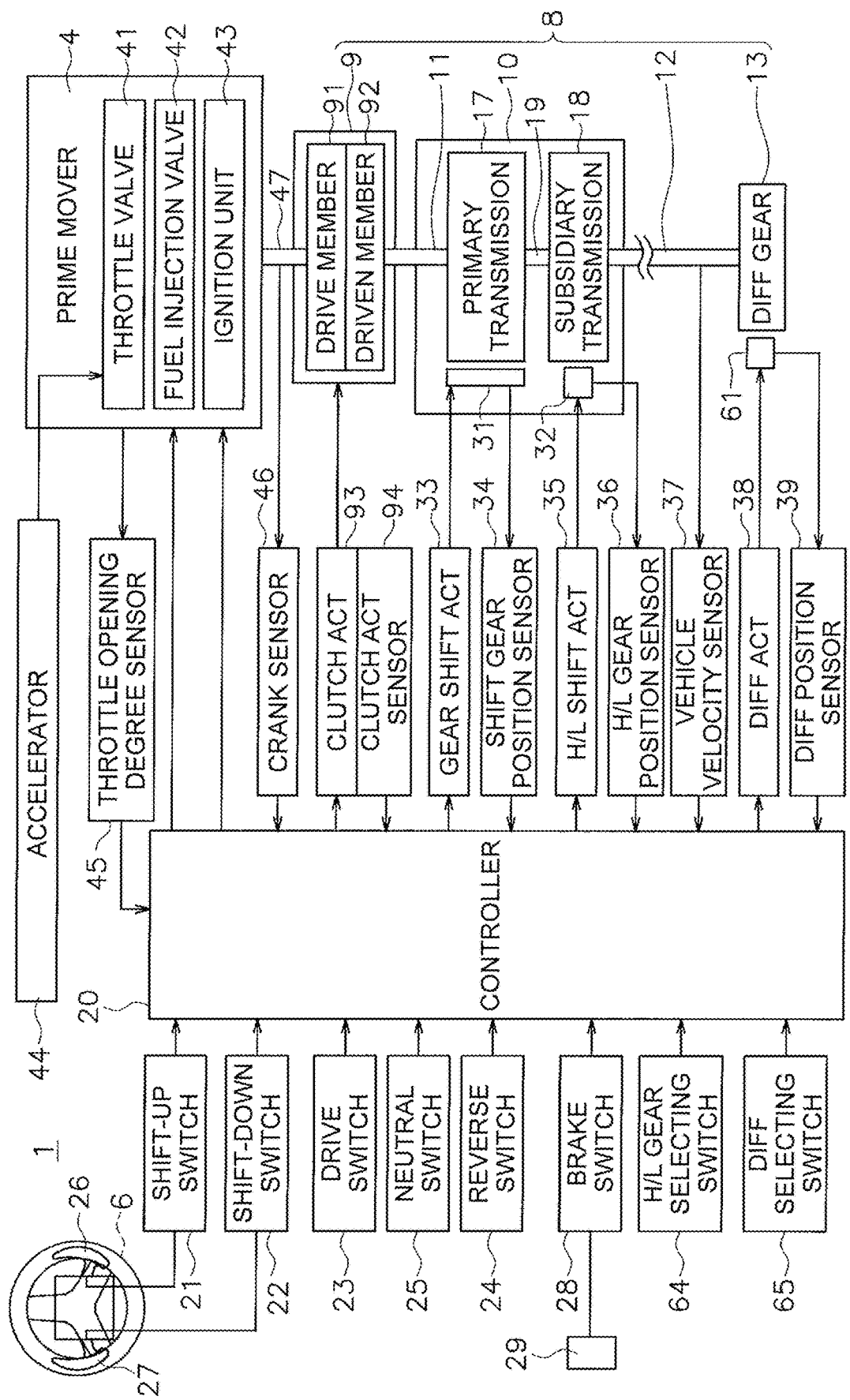
FIG. 2 is a block diagram showing a drive train and a control system of the vehicle.

FIG. 2 is a block diagram showing a drive train and a control system of the vehicle 1. As shown in FIG. 2, the vehicle 1 includes the prime mover 4 and a power train 8. In the present preferred embodiment, the prime mover 4 is an engine (for example, an internal combustion engine).

The prime mover 4 includes a throttle valve 41, a fuel injection valve 42 and an ignition unit 43. An accelerator 44 is coupled to the throttle valve 41. The accelerator 44 is operated by a driver. The accelerator 44 may be an accelerator pedal. The opening degree of the throttle valve 41 (hereinafter referred to as "throttle opening degree") is changed in response to operating the accelerator 44. Therefore, the throttle opening degree is changed in accordance with the operating amount of the accelerator 44 (hereinafter referred to as "accelerator operating amount").

The fuel injection valve 42 injects fuel into the prime mover 4, and the amount of fuel to be injected is set in accordance with the accelerator operating amount or so forth. The ignition unit 43 causes spark discharge inside the prime mover 4 at predetermined ignition timing within an engine cycle, such that a mixed gas of fuel and air is ignited.

Figure 3:
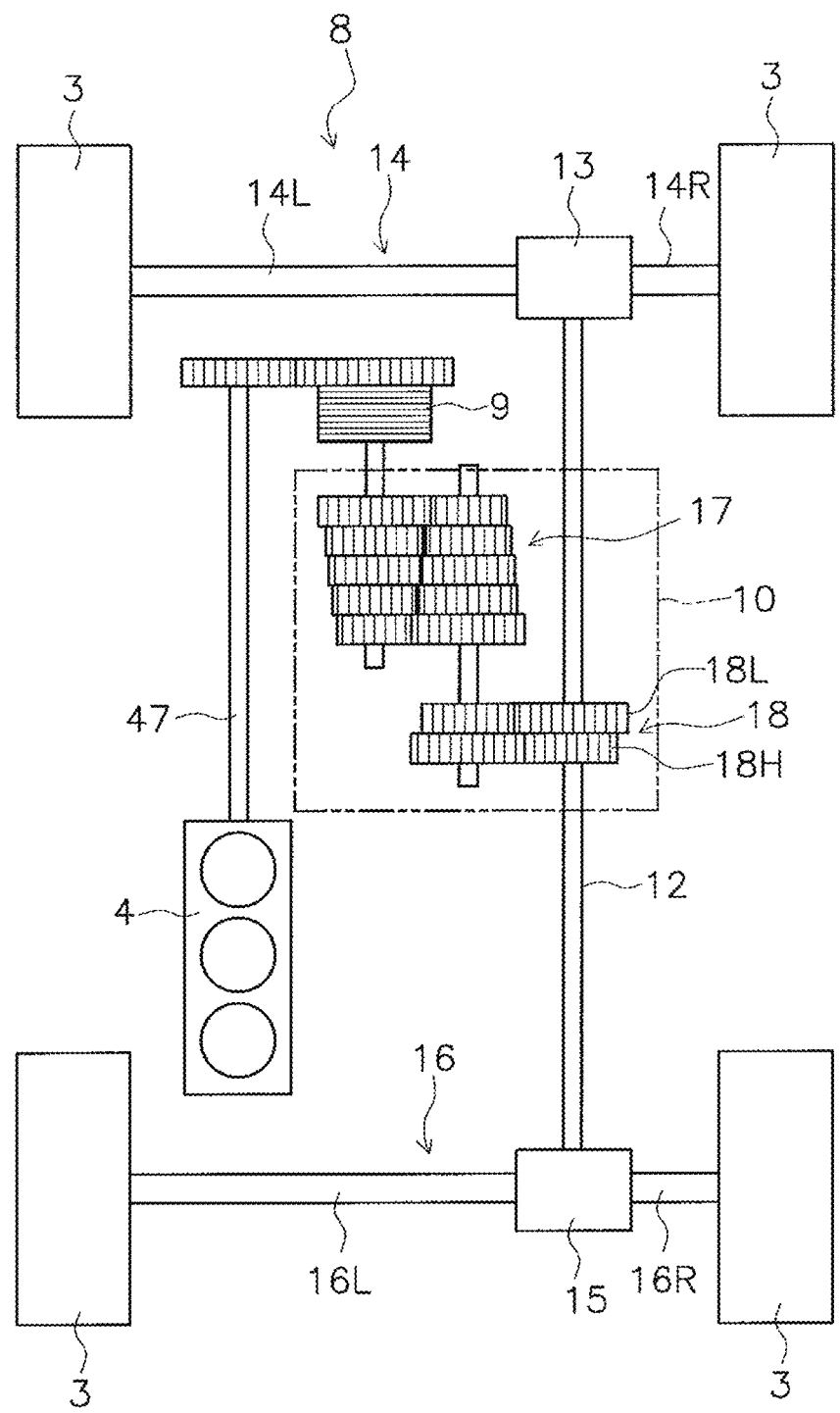
FIG. 3 is a schematic diagram of a configuration of a power train of the vehicle.

The power train 8 transmits a driving force from the prime mover 4 to the wheels 3. FIG. 3 is a schematic diagram of a structure of the power train 8. As shown in FIG. 3, the power train 8 includes a clutch 9, a transmission 10, a propeller shaft 12, a first differential gear 13, a first axle 14, a second differential gear 15 and a second axle 16.

The clutch 9 is connected to a crankshaft 47 of the prime mover 4. The transmission 10 is connected to the clutch 9 and the propeller shaft 12. The propeller shaft 12 extends in a vehicle back-and-forth direction. The propeller shaft 12 is connected to the first axle 14 through the first differential gear 13. The first axle 14 extends in the right-and-left direction and is connected to the right and left wheels 3.

Additionally, the propeller shaft 12 is connected to the second axle 16 through the second differential gear 15. The second axle 16 extends in the right-and-left direction and is connected to the right and left wheels 3. It should be noted that the first axle 14 may be connected to the front wheels, whereas the second axle 16 may be connected to the rear wheels. Alternatively, the first axle 14 may be connected to the rear wheels, whereas the second axle 16 may be connected to the front wheels.

The clutch 9 is disposed in a driving force transmission path of the power train 8. The clutch 9 is, for example, a friction clutch. As shown in FIG. 2, the clutch 9 includes a drive member 91 and a driven member 92. The drive member 91 is connected to the crankshaft 47 of the prime mover 4. The driven member 92 is connected to the transmission 10.

The drive member 91 and the driven member 92 are movable so as to approach toward and separate from each other. The drive member 91 and the driven member 92 are, for instance, clutch plates. It should be noted that each of the drive member 91 and the driven member 92 may have a different shape from a plate shape. Rotation of the crankshaft 47 of the prime mover 4 is transmitted to the drive member 91. A reduction gear may be provided between the crankshaft 47 and the drive member 91.

The clutch 9 is able to be set in a disengaged state, an engaged state and a half-engaged state. In the disengaged state, the drive member 91 and the driven member 92 are separated from each other, such that a torque is not transmitted therebetween. In the engaged state, the drive member 91 and the driven member 92 are engaged with each other without sliding against each other, such that a torque is transmitted therebetween. The half-engaged state is an intermediate state between the engaged state and the disengaged state. In the half-engaged state, the drive member 91 and the driven member 92 make contact with each other while sliding against each other (sliding contact), such that a portion of the torque is transmitted therebetween.

The transmission 10 is disposed in the driving force transmission path of the power train 8. The transmission 10 includes a primary transmission 17 and a subsidiary transmission 18. The primary transmission 17 includes a plurality of shift gears. The plurality of shift gears are able to be disposed in a plurality of gear positions. The plurality of gear positions include at least one forward gear position, at least one reverse gear position and a neutral position. Additionally, the plurality of shift gears include a plurality of gear positions having different gear ratios.

The primary transmission 17 includes a shift member 31. The shift member 31 may be, for instance, a shift cam, a shift fork or so forth. One of the plural shift gears to be engaged is changed by displacement of the shift member 31, such that one of the gear positions of the primary transmission 17 is selected. The primary transmission 17 outputs rotation transmitted to an input shaft 11 of the transmission 10 from the clutch 9 after converting the rotation in accordance with the gear ratio and rotational direction corresponding to one selected from the gear positions of the primary transmission 17.

The subsidiary transmission 18 is connected to the primary transmission 17 through a transmission shaft 19. As shown in FIG. 3, the subsidiary transmission 18 includes high and low gears 18H and 18L having gear ratios that are different from each other. The subsidiary transmission 18 is able to select either the high gear 18H or the low gear 18L as the gear position thereof.

As shown in FIG. 2, the subsidiary transmission 18 includes a shift member 32. The shift member 32 may be, for instance, a shift cam or a shift fork. The gear position of the subsidiary transmission 18 is able to be selected from the high gear 18H and the low gear 18L by shifting the shift member 32. The subsidiary transmission 18 is connected to the propeller shaft 12. The subsidiary transmission 18 outputs rotation, transmitted thereto from the primary transmission 17, to the propeller shaft 12 after converting the rotation in accordance with the gear ratio corresponding to one selected from the gear positions of the subsidiary transmission 18.

The first differential gear 13 transmits the rotation of the propeller shaft 12 to the first axle 14. As shown in FIG. 3, the first axle 14 includes a right axle 14R and a left axle 14L. The first differential gear 13 is switched among an unlocked state, a locked state and a neutral state. In the unlocked state, the first differential gear 13 allows a difference in the rotational velocity between the right axle 14R and the left axle 14L in accordance with a difference in the load between the right axle 14R and the left axle 14L, and transmits the rotation of the propeller shaft 12 to the right and left axles 14R and 14L.

In the locked state, the first differential gear 13 prevents a difference in the rotational velocity between the right wheel 3 and the left wheel 3. In short, in the locked state, the first differential gear 13 transmits the rotation of the propeller shaft 12 to the right and left axles 14R and 14L such that the right and left axles 14R and 14L are rotated at the same rotational velocity. The right and left axles 14R and 14L are rotated, such that the right and left wheels 3 are rotated. In the neutral state, the first differential gear 13 decouples the propeller shaft 12 and the right and left axles 14R and 14L. Therefore, in the neutral state of the first differential gear 13, the rotation of the propeller shaft 12 is not transmitted to the right and left axles 14R and 14L, such that the right and left axles 14R and 14L are able to idle with respect to the propeller shaft 12.

Figure 4:
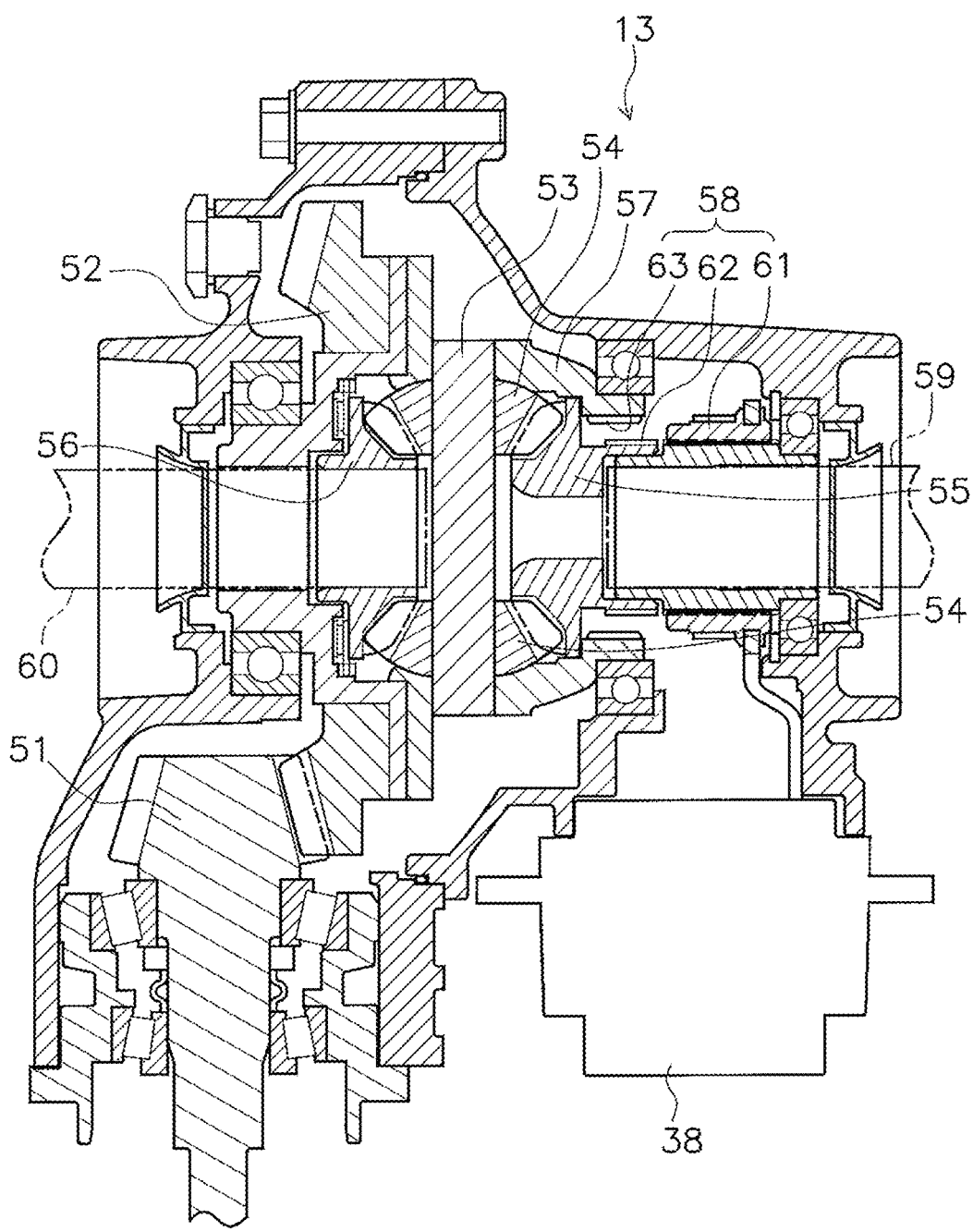
FIG. 4 is a cross-sectional view of a differential gear.

FIG. 4 is a cross-sectional view of the first differential gear 13. As shown in FIG. 4, the first differential gear 13 includes a drive pinion gear 51, a ring gear 52, a differential pinion shaft 53, a differential pinion gear 54, a right side gear 55, a left side gear 56 and a differential case 57.

The drive pinion gear 51 is coupled to the propeller shaft 12. The ring gear 52 is meshed with the drive pinion gear 51. The differential pinion shaft 53 is rotated together with the ring gear 52. The differential pinion gear 54 is rotated about the rotational center of the right and left axles 14R and 14L together with the differential pinion shaft 53. Additionally, the differential pinion gear 54 is rotated about the axis of the differential pinion shaft 53 with respect to the differential pinion shaft 53. The right and left side gears 55 and 56 are meshed with the differential pinion gear 54. The differential case 57 accommodates the differential pinion gear 54 and the differential pinion shaft 53. The differential case 57 is coupled to the ring gear 52, and is rotated together with the ring gear 52.

The first differential gear 13 includes a differential lock 58, a right output shaft 59 and a left output shaft 60. The right output shaft 59 is coupled to the right axle 14R. The left output shaft 60 is coupled to the left axle 14L. The differential lock 58 switches the first differential gear 13 between the locked state and the unlocked state. The differential lock 58 includes a shift member 61, a first meshing portion 62 and a second meshing portion 63.

The shift member 61 is movable with respect to the right output shaft 59 in the axial direction of the right output shaft 59. The first meshing portion 62 is provided on the right side gear 55. The second meshing portion 63 is provided on the differential case 57. The first differential gear 13 is switched among the neutral state, the unlocked state and the locked state in conjunction with movement of the shift member 61 in the axial direction of the right output shaft 59.

Figure 5A:
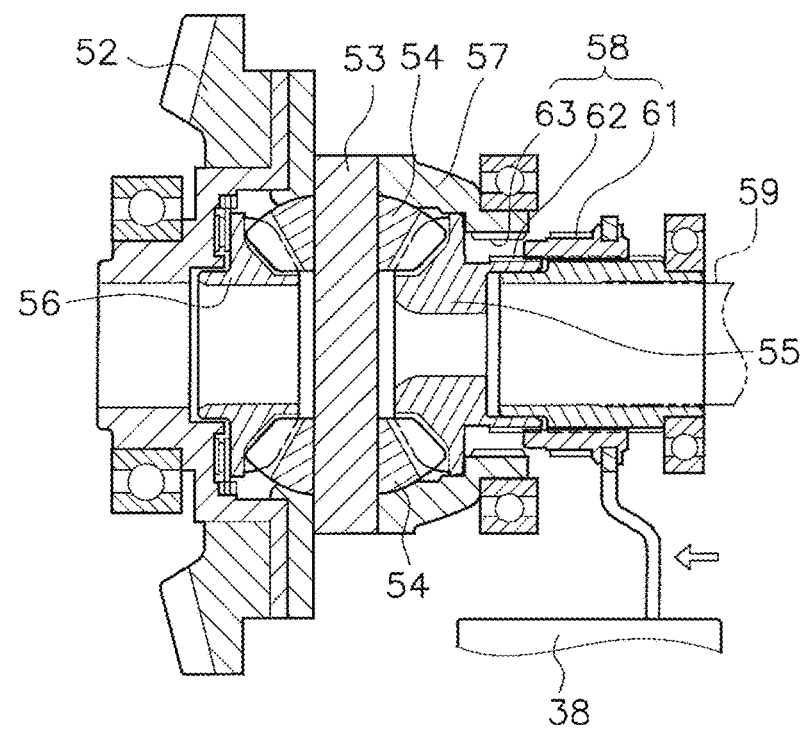
FIGS. 5A and 5B are diagrams showing an action of the differential gear.

As shown in FIG. 5A, when the shift member 61 is meshed with the first meshing portion 62, the right output shaft 59 is fixed to the right side gear 55. It should be noted that in conjunction with rotation of the differential pinion gear 54 about the axis of the differential pinion shaft 53, the right and left side gears 55 and 56 are rotatable at rotational velocities different from each other. Accordingly, the first differential gear 13 is set in the unlocked state.

Figure 5B:
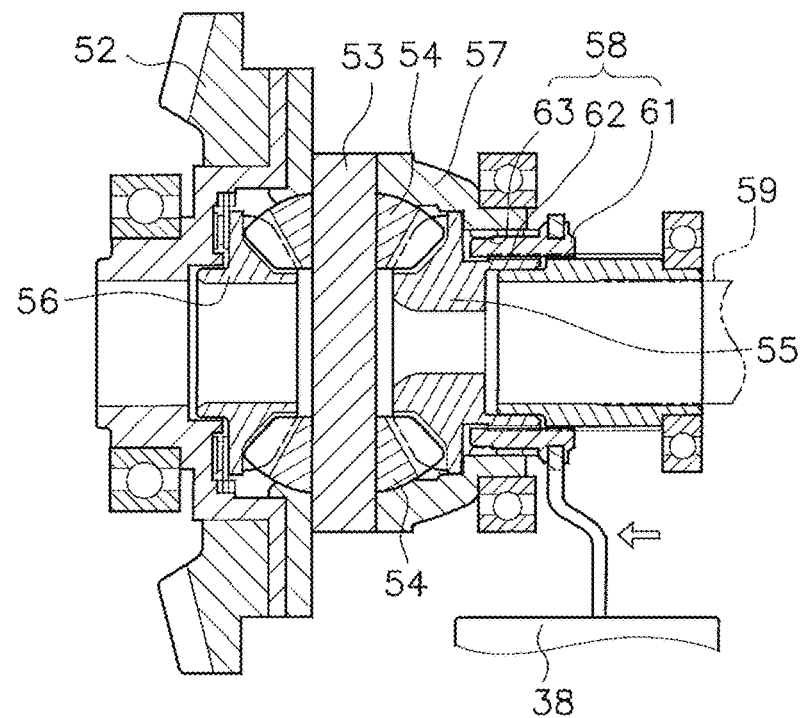

As shown in FIG. 5B, when the shift member 61 is meshed with the first and second meshing portions 62 and 63, the right and left side gears 55 and 56 are coupled through the differential case 57. Accordingly, relative rotation of the right and left side gears 55 and 56 is prevented, such that the first differential gear 13 is set in the locked state.

It should be noted that as shown in FIG. 4, when the shift member 61 is not meshed with both the first meshing portion 62 and the second meshing portion 63, the right output shaft 59 becomes rotatable with respect to the right side gear 55, and the left output shaft 60 becomes rotatable with respect to the left side gear 56. Accordingly, the first differential gear 13 is set in the neutral state. In the neutral state, the right and left output shafts 59 and 60 are able to idle with respect to the ring gear 52.

The second differential gear 15 preferably has a similar configuration to the first differential gear 13. The second differential gear 15 transmits rotation of the propeller shaft 12 to right and left axles 16R and 16L. The right and left axles 16R and 16L are rotated, such that the right and left wheels 3 are rotated. It should be noted that the second differential gear 15 may not include the differential lock 58. In other words, the second differential gear 15 may be always in the unlocked state.

As shown in FIG. 2, the vehicle 1 includes a controller 20. The controller 20 includes a computer such as a CPU and memories such as an RAM and an ROM. The controller 20 is programmed or configured to control the prime mover 4, the clutch 9, the transmission 10 and the front and rear differential gears 13 and 15.

The vehicle 1 includes a throttle opening degree sensor 45 and a crank sensor 46. The throttle opening degree sensor 45 detects the throttle opening degree of the prime mover 4. A signal indicating the throttle opening degree is inputted into the controller 20. The crank sensor 46 is a sensor that detects rotation of the crankshaft 47 of the prime mover 4. A signal indicating rotation of the crankshaft 47 is inputted into the controller 20.

The crank sensor 46 is a magnetic sensor, for instance, and detects rotation of a magnet that rotates together with the crankshaft 47. The controller 20 may be programmed or configured to calculate an engine rotational speed from the rotational velocity of the crankshaft 47 detected by the crank sensor 46. The engine rotational speed corresponds to an input-side rotational velocity of the clutch 9. Therefore, the crank sensor 46 detects the input-side rotational velocity of the clutch 9.

The clutch 9 includes a clutch actuator 93. The controller 20 controls the clutch actuator 93. The clutch actuator 93 makes the drive member 91 and the driven member 92 in the clutch 9 approach to and separate from each other. The clutch actuator 93 strengthens or weakens a pressing force acting between the drive member 91 and the driven member 92, while the drive member 91 and the driven member 92 make contact with each other. Accordingly, the drive member 91 and the driven member 92 make frictional contact with each other, and a torque to be transmitted therebetween increases or decreases.

By controlling the clutch actuator 93, the state of the clutch 9 is able to be changed among the disengaged state, the half-engaged state and the engaged state, and the pressing force acting between the drive member 91 and the driven member 92 is able to be changed in the half-engaged state. The clutch actuator 93 may be an electric actuator, for example. Alternatively, the clutch actuator 93 may be a hydraulic actuator.

The clutch actuator 93 is provided with a clutch actuator sensor 94. The clutch actuator sensor 94 detects the position of an actuating element of the clutch actuator 93. The position of the actuating element of the clutch actuator 93 corresponds to a distance between the drive member 91 and the driven member 92 in the clutch 9. When the drive member 91 and the driven member 92 make contact with each other, the distance corresponds to the pressing force acting between the drive member 91 and the driven member 92. The controller 20 drives the clutch actuator 93 based on an output signal from the clutch actuator sensor 94, such that the pressing force in the clutch 9, in other words, an engaging force is controlled.

The primary transmission 17 includes a gear shift actuator 33. The gear shift actuator 33 actuates the shift member 31, such that the gear position of the primary transmission 17 is changed. The controller 20 executes gear shifting of the primary transmission 17 by controlling the gear shift actuator 33. The gear shift actuator 33 may be an electric actuator, for example. Alternatively, the gear shift actuator 33 may be a hydraulic actuator.

The primary transmission 17 is provided with a shift gear position sensor 34. The shift gear position sensor 34 detects the gear position of the primary transmission 17. An output signal from the shift gear position sensor 34 is inputted into the controller 20. The shift gear position sensor 34 may be a sensor that detects the position of the shift member 31.

The subsidiary transmission 18 includes a high/low shift actuator 35. The high/low shift actuator 35 actuates the shift member 32, such that the gear position of the subsidiary transmission 18 is changed. The controller 20 changes the gear position of the subsidiary transmission 18 by controlling the high/low shift actuator 35. The high/low shift actuator 35 may be an electric actuator, for example. Alternatively, the high/low shift actuator 35 may be a hydraulic actuator.

The subsidiary transmission 18 is provided with a high/low gear position sensor 36. The high/low gear position sensor 36 detects the gear position of the subsidiary transmission 18. An output signal from the high/low gear position sensor 36 is inputted into the controller 20. The high/low gear position sensor 36 may be a sensor that detects the position of the shift member 32.

The power train 8 includes a vehicle velocity sensor 37 that detects the velocity of the vehicle. An output signal from the vehicle velocity sensor 37 is inputted into the controller 20. The vehicle velocity sensor 37 detects the rotational velocity of the wheels 3. For example, the vehicle velocity sensor 37 may be a sensor that detects the rotational velocity of the propeller shaft 12. The rotational velocity of the propeller shaft 12 is proportional to that of the wheels 3. Hence, the rotational velocity of the wheels 3 is able to be detected by detecting the rotational velocity of the propeller shaft 12. Correspondence is established between the rotational velocity of the propeller shaft 12 and the output-side rotational velocity of the clutch 9 based on the shift gear ratio in the transmission 10. Therefore, the vehicle velocity sensor 37 detects the output-side rotational velocity of the clutch 9.

The vehicle velocity sensor 37 is a magnetic sensor, for instance, and detects the rotation of a magnet that rotates together with the propeller shaft 12. The controller 20 may be programmed or configured to calculate the vehicle velocity from the rotational velocity of the propeller shaft 12 detected by the vehicle velocity sensor 37. Alternatively, the vehicle velocity sensor 37 may be a type of sensor other than the magnetic sensor.

The first differential gear 13 includes a differential actuator 38. The differential actuator 38 actuates the shift member 61. The controller 20 switches the first differential gear 13 among the locked state, the unlocked state and the neutral state by controlling the differential actuator 38. The differential actuator 38 may be an electric actuator, for example. Alternatively, the differential actuator 38 may be a hydraulic actuator.

The first differential gear 13 includes a differential position sensor 39. The differential position sensor 39 detects the position of the shift member 61. The position of the shift member 61 indicates the state of the first differential gear 13. An output signal, indicating the position of the shift member 61, is inputted into the controller 20.

As shown in FIG. 2, the vehicle 1 includes a drive switch 23, a reverse switch 24 and a neutral switch 25. The drive switch 23 is a switch to be operated by the driver in order to select at least one forward gear position of the transmission 10. When the drive switch 23 is operated, the controller 20 changes the gear position of the transmission 10 into the forward position by controlling the clutch actuator 93 and the gear shift actuator 33.

The reverse switch 24 is a switch to be operated by the driver in order to select at least one reverse gear position of the transmission 10. When the reverse switch 24 is operated, the controller 20 changes the gear position of the transmission 10 into the reverse position by controlling the clutch actuator 93 and the gear shift actuator 33.

The neutral switch 25 is a switch to be operated by the driver in order to select a neutral state of the transmission 10. When the neutral switch 25 is operated, the controller 20 changes the gear position of the transmission 10 into the neutral position by controlling the clutch actuator 93 and the gear shift actuator 33.

It should be noted that the drive switch 23, the reverse switch 24 and the neutral switch 25 may be provided on a shift lever. Alternatively, the drive switch 23, the reverse switch 24 and the neutral switch 25 may be switches provided separately from each other.

The vehicle 1 includes a shift-up switch 21 and a shift-down switch 22. The shift-up switch 21 is a switch to be operated by the driver in order to change the gear position (gear stage) of the transmission 10 to a high speed side by one stage. The shift-down switch 22 is a switch to be operated by the driver in order to change the gear position (gear stage) of the transmission 10 to a low speed side by one stage.

The shift-up switch 21 is connected to a first shift operator 26. The shift-down switch 22 is connected to a second shift operator 27. The first and second shift operators 26 and 27 may be paddles disposed near, adjacent, or on the steering wheel 6. When the first shift operator 26 is operated, an output signal from the shift-up switch 21 is inputted into the controller 20. When the second shift operator 27 is operated, an output signal from the shift-down switch 22 is inputted into the controller 20.

The controller 20 executes a gear shift action by driving the clutch actuator 93 and the gear shift actuator 33 in response to inputs from the shift switches 21 and 22, such that the gear position (gear stage) is changed among a plurality of forward gear positions.

The vehicle 1 includes a brake switch 28. The brake switch 28 is a switch to be operated by the driver in order to actuate a brake device (not shown in the drawings). The vehicle 1 is decelerated in conjunction with actuation of the brake. The brake switch 28 is connected to a brake operator 29. The brake operator 29 may be, for instance, a brake pedal.

The vehicle 1 includes a high/low gear selecting switch 64. The high/low gear selecting switch 64 is a switch to be operated by the driver in order to select the gear position of the subsidiary transmission 18. The controller 20 switches the gear position of the subsidiary transmission 18 between the high gear 18H and the low gear 18L by controlling the high/low shift actuator 35 in response to an output signal from the high/low gear selecting switch 64.

The vehicle 1 includes a differential selecting switch 65. The differential selecting switch 65 is a switch to be operated by the driver in order to select the state of the first differential gear 13. The controller 20 switches the state of the first differential gear 13 among the locked state, the unlocked state and the neutral state by controlling the differential actuator 38 in response to an output signal from the differential selecting switch 65. It should be noted that the state of the first differential gear 13 may be automatically switched by the controller 20 without being switched by operating the differential selecting switch 65.

Next, control during a moving start of the vehicle 1 will be explained. In the present preferred embodiment, the vehicle 1 is able to execute a moving start in a normal mode and a moving start based on a moving start control.

In the normal mode, the driver selects one of the gear positions other than the neutral position by operating the shift-up switch 21, the shift-down switch 22, the drive switch 23 or the reverse switch 24. Accordingly, the controller 20 changes the gear position of the transmission 10 by driving the gear shift actuator 33.

Moreover, the driver increases the accelerator operating amount by operating the accelerator 44. When the throttle opening degree increases in response to this operation, the engine rotational speed increases. With the increase in the engine rotational speed, the controller 20 increases the engaging force of the clutch 9 by controlling the clutch actuator 93, such that the drive member 91 and the driven member 92 approach each other.

The controller 20 sets a target engine rotational speed in accordance with the throttle opening degree, and controls the engaging force of the clutch 9 such that the engine rotational speed increases toward the target engine rotational speed. Accordingly, the engaging force between the drive member 91 and the driven member 92 gradually increases, and the clutch 9 transitions from the disengaged state to the engaged state via the half-engaged state.

In this way, a torque generated by the prime mover 4 is transmitted to the transmission 10 through the clutch 9. Moreover, the rotational speed changed in the transmission 10 is transmitted to the wheels 3, such that the vehicle 1 moves. After the clutch 9 transitions to the engaged state, the controller 20 executes control of the fuel injection valve 42 (fuel injection control) and control of the ignition unit 43

(ignition control) so as to obtain an engine output in accordance with the throttle opening degree.

When the driver operates the shift-up switch 21, the shift-down switch 22 or the high/low gear selecting switch 64 during traveling of the vehicle 1, a gear shift command is inputted into the controller 20. In response to this, the controller 20 executes the gear shift action. Specifically, the controller 20 disengages the clutch 9 by controlling the clutch actuator 93. Moreover, the controller 20 changes the gear position of the primary transmission 17 in response to the gear shift command by controlling the gear shift actuator 33. Alternatively, the controller 20 changes the gear position of the subsidiary transmission 18 in response to the gear shift command by controlling the high/low shift actuator 35.

Thereafter, the controller 20 moves the clutch 9 to the engaged state via the half-engaged state by controlling the clutch actuator 93. When the clutch 9 is in the engaged state and the gear shift action is completed, the controller 20 executes the fuel injection control and the ignition control so as to obtain the engine output in accordance with the throttle opening degree.

When the vehicle velocity becomes lower than a shift-down threshold in the engaged state of the clutch 9, the controller 20 executes automatic shift-down control. Here, the shift-down threshold has been preliminarily set and the value thereof depends on the gear positions. More specifically, when the vehicle velocity becomes lower than a clutch disengaging threshold that the value thereof depends on the gear stages, the controller 20 changes the clutch 9 into the disengaged state by controlling the clutch actuator 93. Subsequently, when the vehicle velocity becomes lower than the shift-down threshold, the controller 20 changes the gear position by controlling the gear shift actuator 33 so as to shift down the gear stage by one stage. When the vehicle velocity further becomes lower than the shift-down threshold that the value thereof corresponds to the gear stage obtained after shifting down, the controller 20 changes the gear position so as to further shift down the gear stage by one stage. Thereafter, the controller 20 moves the clutch 9 to the engaged state via the half-engaged state by controlling the clutch actuator 93. When the clutch 9 becomes the engaged state and the gear shift action is completed, the controller 20 executes the fuel injection control and the ignition control so as to obtain the engine output in accordance with the throttle opening degree.

When the gear stage becomes the lowest stage and the vehicle velocity becomes lower than the clutch disengaging threshold corresponding to the lowest stage, the controller 20 disengages the clutch 9. More specifically, when the vehicle velocity becomes lower than the clutch disengaging threshold while the lowest one of the plurality of forward gear positions is selected, the clutch 9 is disengaged. This configuration is similarly true of the at least one reverse gear position. In a configuration that the number of reverse gear positions is only one, the clutch 9 is disengaged when the vehicle velocity becomes lower than the clutch disengaging threshold corresponding to the reverse gear position.

Figure 6:
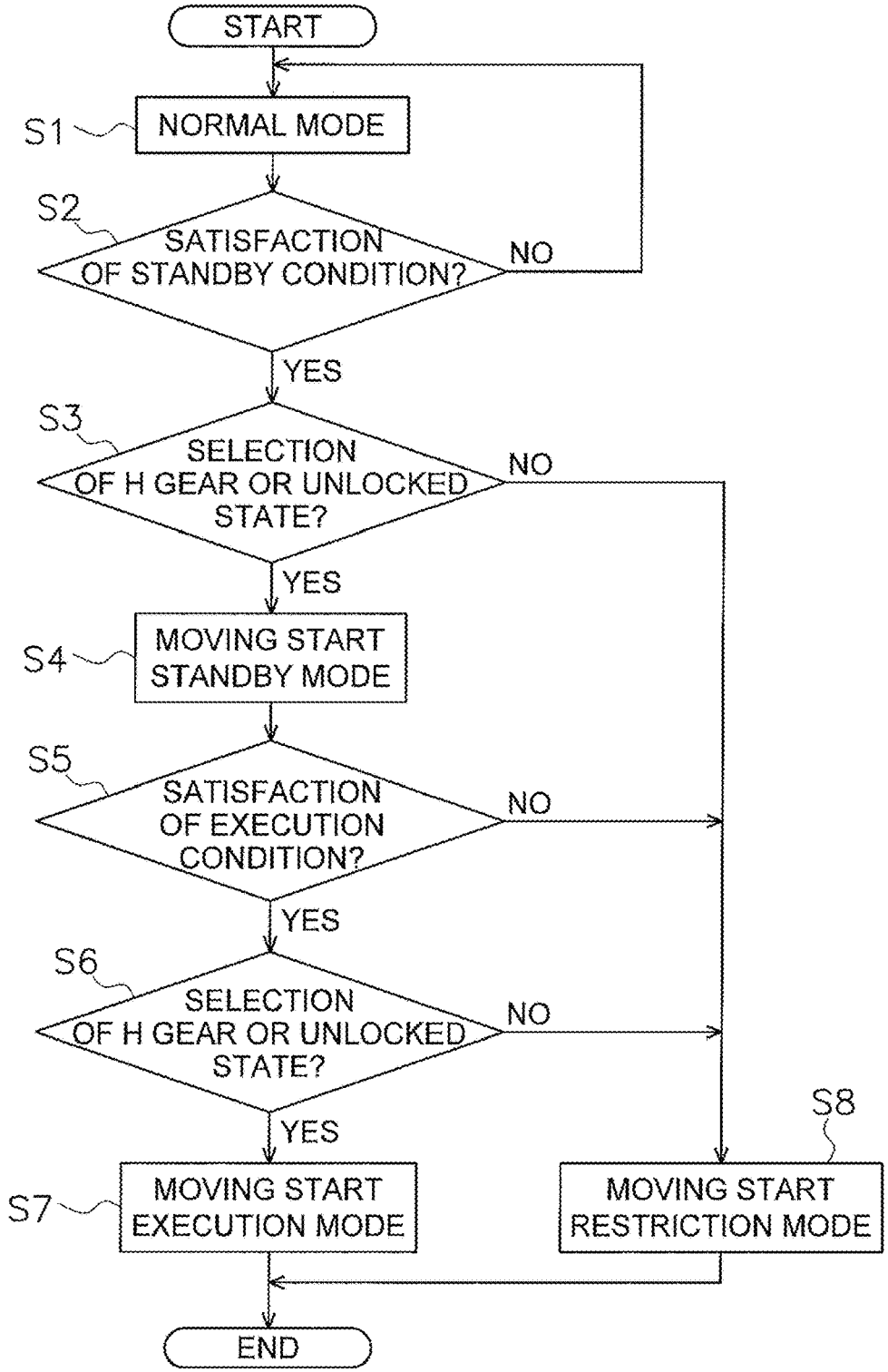
FIG. 6 is a flowchart showing a process during a moving start control.

Next, the moving start control will be explained. During the moving start control, the controller 20 causes a driving force during a moving start of the vehicle 1 that is larger than a driving force during a normal moving start by controlling the engaging force of the clutch 9. When a driver operates specific operators to command states in which execution of the moving start control is instructed, the moving start control is started. FIG. 6 is a flowchart showing a process during the moving start control to be executed by the controller 20.

In step S1, the controller 20 sets a control mode to the normal mode. In this case, the moving start is executed in the normal mode.

In step S2, the controller 20 determines whether or not a standby condition has been satisfied. The standby condition indicates that predetermined operations have been executed by the specific operators. Specifically, the standby condition indicates that the first and second shift operators 26 and 27 have been operated, and in addition, that the brake operator 29 has been operated. For example, the standby condition is determined as having been satisfied when the first and second shift operators 26 and 27 have been pulled toward the driver and the brake operator 29 has been pushed. When the standby condition has not been satisfied yet, the normal mode is maintained in step S1. When the standby condition has been satisfied, the process proceeds to step S3.

In step S3, the controller 20 determines whether or not either of the following conditions has been satisfied: the high gear 18H has been selected; and the first differential gear 13 is in the unlocked state.

The process proceeds to step S4 when either of the following conditions is determined as having been satisfied in step S3: the high gear 18H has been selected; and the first differential gear 13 is in the unlocked state. In step S4, the controller 20 sets the control mode to a moving start standby mode.

Figure 7:
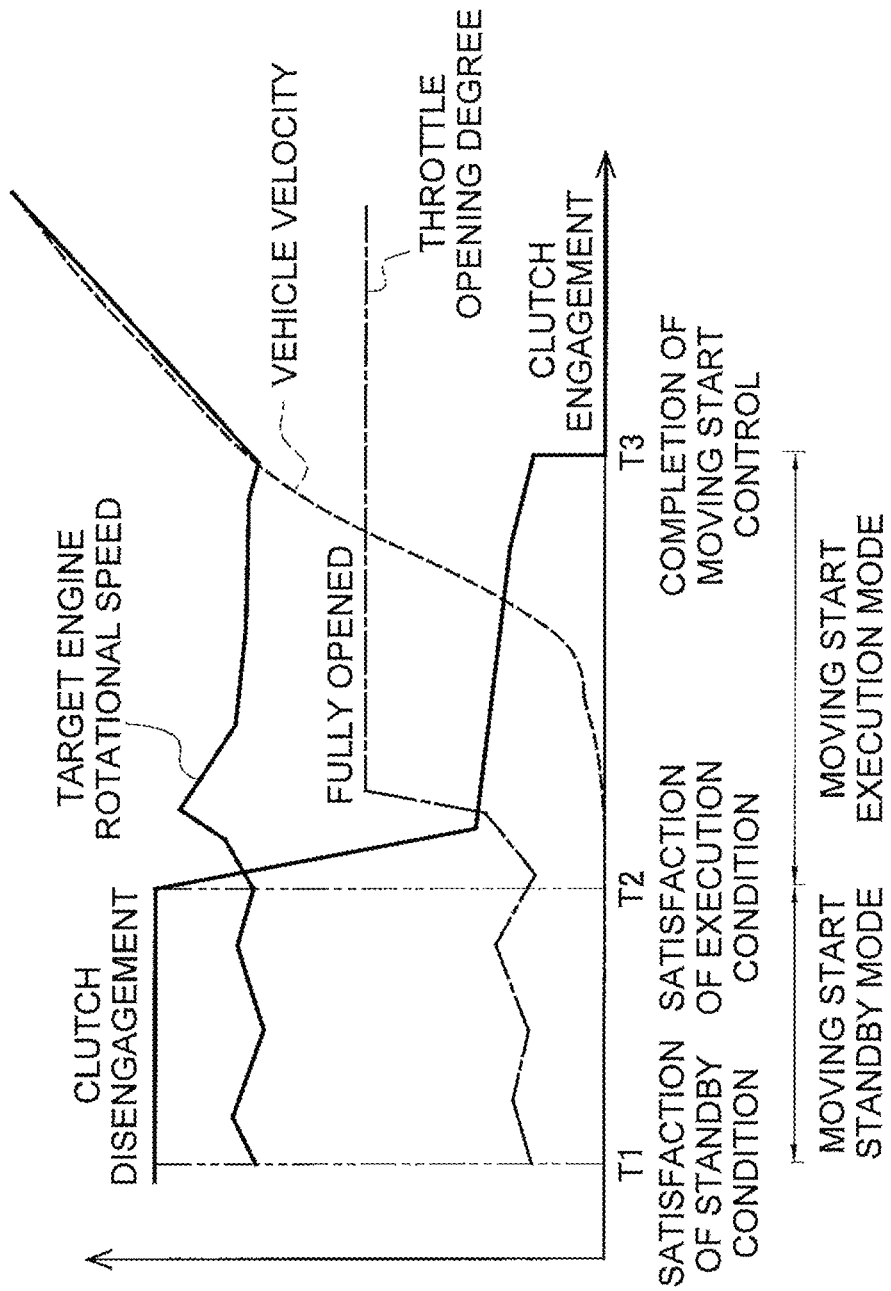
FIG. 7 is a timing chart showing variations in the clutch state, throttle opening degree and so forth during the moving start control.

FIG. 7 is a timing chart showing variations in the states of the clutch 9, vehicle speed and so forth during the moving start control. As shown in FIG. 7, when the standby condition is satisfied at a point of time T1, the control mode is set to the moving start standby mode. In the moving start standby mode, the clutch 9 is maintained in the disengaged state. Therefore, even if the driver increases the accelerator operating amount by operating the accelerator 44 in the moving start standby mode, the vehicle 1 does not travel and the vehicle velocity thereof does not increase.

During standby of the moving start, the driver releases the brake operator 29 from the operated state thereof while keeping the first and second shift operators 26 and 27 in the operated states. When the driver operates the accelerator 44 under this condition, the throttle opening degree is changed in accordance with the operating amount of the accelerator 44, such that the engine rotational speed is changed. Therefore, in the moving start standby mode, the engine rotational speed is increased when the driver increases the accelerator operating amount by operating the accelerator 44 while the vehicle 1 stands still.

In step S5 of FIG. 6, the controller 20 determines whether or not an execution condition has been satisfied. The execution condition is that the predetermined operations have been executed by the specific operators. Specifically, the execution condition includes the requirements that the accelerator operating amount is greater than or equal to a predetermined threshold and that the first and second shift operators 26 and 27 are released from the operated states thereof. For example, the execution condition is determined as having been satisfied when the driver has fully pushed down the accelerator 44 and has released the first and second shift operators 26 and 27 from the operated states thereof. When the execution condition has been satisfied, the process proceeds to step S6.

In step S6, similarly to step S3, the controller 20 determines whether or not either of the following conditions has been satisfied: the high gear 18H has been selected; and the first differential gear 13 is in the unlocked state. The process proceeds to step S7 when either of the following conditions is determined as having been satisfied in step S6: the high gear 18H has been selected; and the first differential gear 13 is in the unlocked state.

In step S7, the controller 20 sets the control mode to a moving start execution mode. As shown in FIG. 7, in the moving start execution mode, the controller 20 causes the clutch 9 to transition from the disengaged state to the engaged state through the half-engaged state. Accordingly, the driving force of the prime mover 4 is transmitted to the wheels 3, such that the vehicle 1 starts moving.

As shown in FIG. 6, in step S3 or S6, when the first differential gear 13 is determined as not being in the unlocked state, the process proceeds to step S8. In step S3 or S6, when the high gear 18H is determined as not being selected, the process also proceeds to step S8.

The phrase "not in the unlocked state" means that the first differential gear 13 is in a state other than the unlocked state. Therefore, the phrase "not in the unlocked state" encompasses the locked state. Additionally, the phrase "not in the unlocked state" also encompasses that it has not been decided yet in which of the locked state and the unlocked state the first differential gear 13 is being set. When it has not been decided yet in which of the locked state and the unlocked state the first differential gear 13 is being set includes, for instance, the differential gear 13 not being firmly engaged as when a sleeve that switches the first differential gear 13 is not fitted in a proper state.

The phrase "the high gear 18H is decided as not selected" encompasses that the low gear 18L is selected. Additionally, the phrase "the high gear 18H is determined as not selected" encompasses that it has not been decided yet which of the high gear 18H and the low gear 18L is selected. When it has not been decided yet which of the high gear 18H and the low gear 18L is being selected includes, for instance, the gear position of the subsidiary transmission 18 transitioning between the high gear 18H and the low gear 18L. Alternatively, when it has not been decided yet which of the high gear 18H and the low gear 18L is being selected include the transmission 10 in the neutral state. Yet alternatively, when it has not been decided yet which of the high gear 18H and the low gear 18L is being selected includes the gear position of the transmission 10 in the reverse gear position.

In step S8, the control mode is set to a moving start restriction mode. In the moving start restriction mode, the controller 20 prevents the moving start control. Therefore, in the moving start restriction mode, the controller 20 temporarily prevents moving start of the vehicle 1, and thereafter, executes a moving start of the vehicle 1 in the normal mode.

Figure 8:
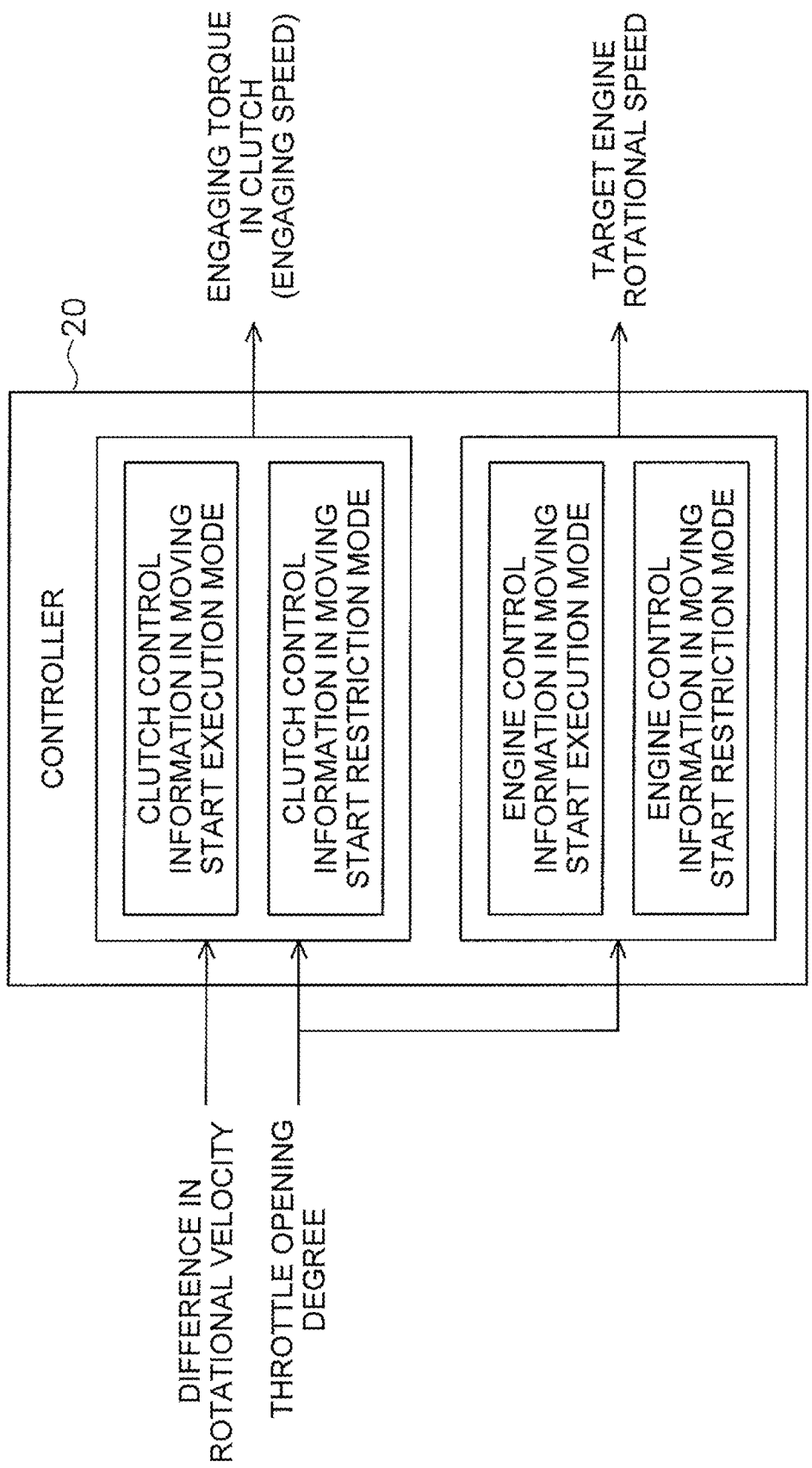
FIG. 8 is a block diagram showing clutch control and engine control during the moving start control.

FIG. 8 is a block diagram showing clutch control and engine control in the moving start execution mode and the moving start restriction mode. As shown in FIG. 8, the controller 20 stores clutch control information in the moving start execution mode and in the moving start restriction mode. In the moving start restriction mode, the moving start control may be prevented as described above, but alternatively, it is also possible to change a clutch engaging method during the moving start control. This clutch control information defines relationships among the difference in the rotational velocity between the input and output sides in the clutch 9, the throttle opening degree and the engaging torque in the clutch 9. The clutch control information may be expressed in the form of, for instance, a map, a table, a calculation formula or so forth.

Figure 9A:
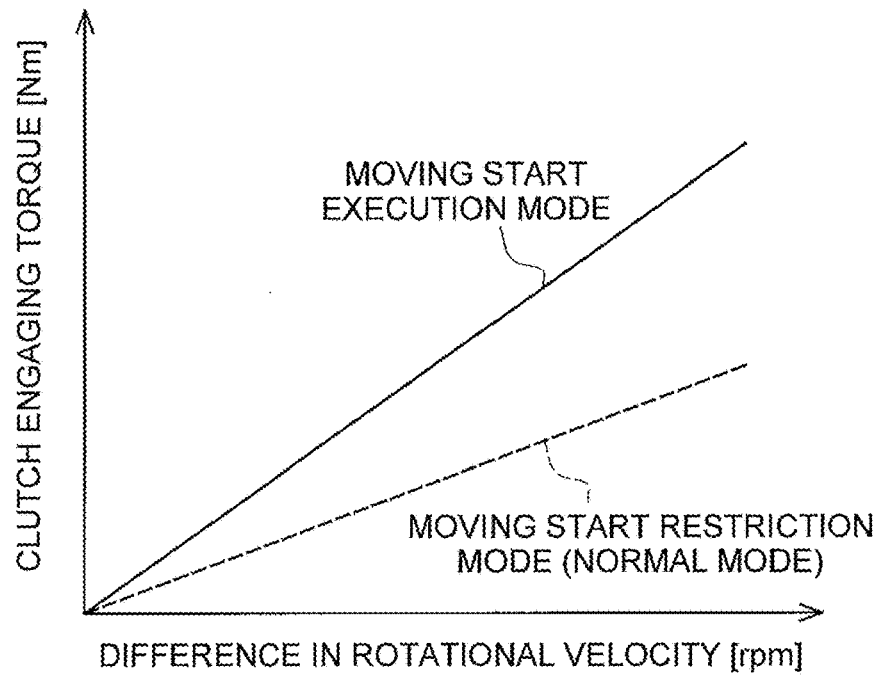
FIGS. 9A and 9B are charts showing the clutch control during the moving start control.

FIG. 9A is a chart showing a relationship between a difference in rotational velocity and the engaging torque in the clutch 9, which is defined by the clutch control information. As shown in FIG. 9A, in the moving start execution mode, the engaging torque in the clutch 9 is increased with an increase in the difference in rotational velocity. The engaging torque in the clutch 9 correlates to an engaging speed of the clutch 9. The engaging speed of the clutch 9 is increased with an increase in the engaging torque of the clutch 9. Therefore, in the moving start execution mode, the engaging speed of the clutch 9 is increased with the increase in the difference in rotational velocity. Accordingly, the driving force during a moving start becomes larger in the moving start execution mode than in the moving start restriction mode.

Similarly, in the moving start restriction mode, the engaging torque in the clutch 9 is increased with an increase in the difference in rotational velocity. It should be noted that at the same value of the difference in rotational velocity, the engaging torque in the clutch 9 is larger in the moving start execution mode than in the moving start restriction mode. Therefore, at the same value of difference in rotational velocity, the clutch 9 is engaged at a greater engaging speed in the moving start execution mode than in the moving start restriction mode. Accordingly, the driving force during a moving start becomes larger in the moving start execution mode than in the moving start restriction mode.

Figure 9B:
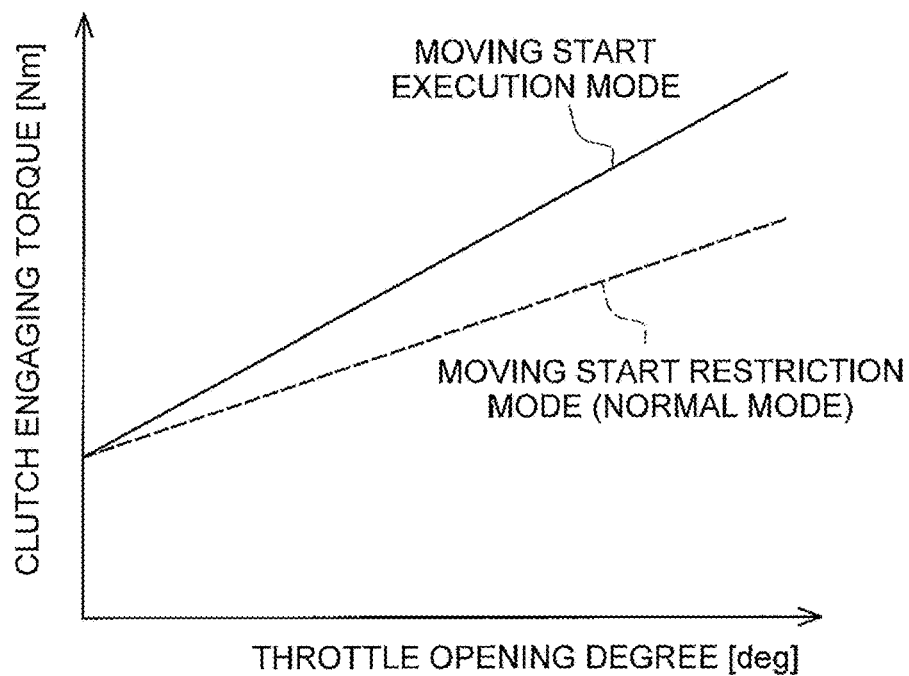

FIG. 9B is a chart showing a relationship between the throttle opening degree and the engaging torque in the clutch 9, which is defined by the clutch control information. As shown in FIG. 9B, in the moving start execution mode, the engaging torque in the clutch 9 is increased with an increase in the throttle opening degree. Therefore, in the moving start execution mode, the engaging speed of the clutch 9 is increased with an increase in the throttle opening degree.

Similarly, in the moving start restriction mode, the engaging torque in the clutch 9 is increased with an increase in the throttle opening degree. It should be noted that at the same value of the throttle opening degree, the engaging torque in the clutch 9 is larger in the moving start execution mode than in the moving start restriction mode. Therefore, at the same value of the throttle opening degree, the clutch 9 is engaged at a greater engaging speed in the moving start execution mode than in the moving start restriction mode.

As shown in FIG. 8, the controller 20 stores engine control information in the moving start execution mode and in the moving start restriction mode. This engine control information includes information that defines a relationship between the throttle opening degree and the target engine rotational speed. The engine control information may be expressed in the form of, for instance, a map, a table, a calculation formula or so forth.

Figure 10:
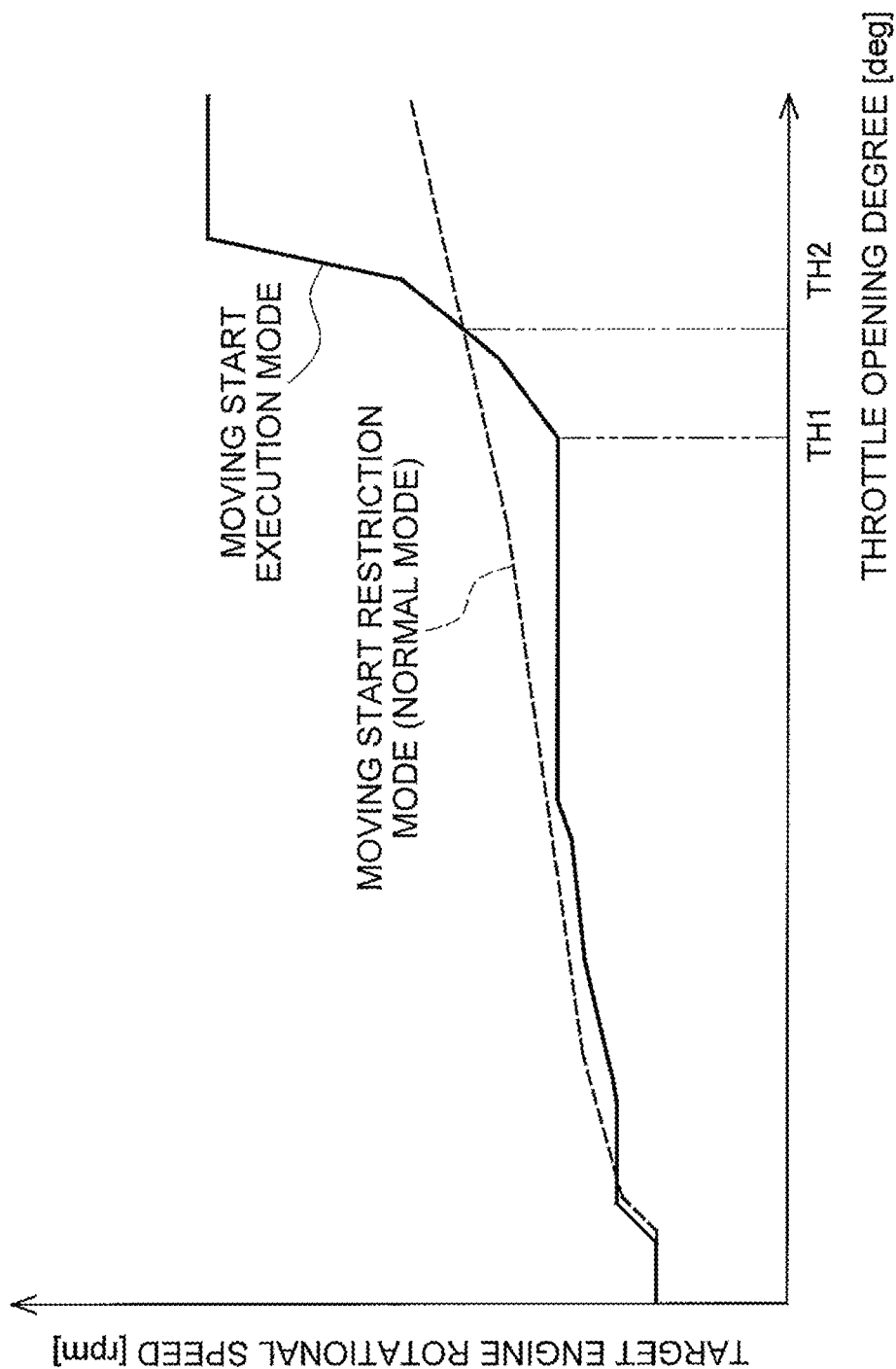
FIG. 10 is a chart showing the engine control during the moving start control.

FIG. 10 is a chart showing the relationship between the throttle opening degree and the target engine rotational speed, which is based on the engine control information. As shown in FIG. 10, in both the moving start execution mode and the moving start restriction mode, the target engine rotational speed is increased with an increase in the throttle opening degree. It should be noted that in the moving start execution mode, the target engine rotational speed is abruptly increased when the throttle opening degree is greater than or equal to a predetermined first opening degree TH1. Then, when the throttle opening degree is greater than or equal to a second opening degree TH2, the target engine rotational speed in the moving start execution mode becomes greater than the target engine rotational speed in the moving start restriction mode. Therefore, when the accelerator 44 is operated by a large amount, the engine rotational speed in the moving start execution mode becomes greater than the engine rotational speed in the moving start restriction mode. Accordingly, the driving force during a moving start becomes larger in the moving start execution mode than in the moving start restriction mode.

It should be noted that as described above, in the moving start restriction mode, the controller 20 is configured or programmed to start moving the vehicle 1 in the normal mode. Therefore, similarly in the normal mode, the engaging speed of the clutch 9 is controlled based on the clutch control information in the moving start restriction mode. Additionally, similarly in the normal mode, the engine rotational speed is controlled based on the engine control information in the moving start restriction mode.

As described above, in the vehicle 1 according to various preferred embodiments of the present invention, the controller 20 is configured or programmed to control the engaging force of the clutch 9 during a moving start in accordance with which of the locked state and the unlocked state is selected by the first differential gear 13. Specifically, when the first differential gear 13 is in the locked state, the controller 20 executes a moving start of the vehicle 1 in the moving start restriction mode even if the execution condition of the moving start control is satisfied. Likewise, when it has not been decided which of the locked state and the unlocked state the first differential gear 13 is being set, the controller 20 executes a moving start of the vehicle 1 in the moving start restriction mode. Accordingly, in accordance with which of the locked state and the unlocked state is selected by the first differential gear 13, it is possible to execute the moving start control in a mode suitable for the present situation of the vehicle 1.

The controller 20 is configured or programmed to control the engaging force of the clutch 9 in accordance with which of the high gear 18H and the low gear 18L is selected in the transmission 10. Specifically, when the gear position of the subsidiary transmission 18 is the low gear 18L, the controller 20 executes a moving start of the vehicle 1 in the moving start restriction mode even if the execution condition of the moving start control is satisfied. Additionally, when it has not been decided which of the high gear 18H and the low gear 18L is being selected, the controller 20 also executes a moving start of the vehicle 1 in the moving start restriction mode. Accordingly, in accordance with which of the low gear 18L and the high gear 18H is selected, it is possible to execute the moving start control in a mode suitable for the present situation of the vehicle 1.

Preferred embodiments of the present invention have been explained above. However, the present invention is not limited to the preferred embodiments described above, and a variety of changes can be made without departing from the scope of the present invention.

The vehicle 1 is not limited to an ROV, and may be another type of vehicle such as an ATV (All Terrain Vehicle). The structure of the vehicle 1 may not be limited to that described above, and may be changed. For example, at least one rear seat may be disposed behind the right and left seats 5R and 5L.

The prime mover 4 may be another type of device such as an electric motor. In this case, the engine rotational speed may be an output rotational speed of the prime mover 4. A target output rotational speed of the prime mover 4 may be determined in accordance with the accelerator operating amount.

Figure 11A:
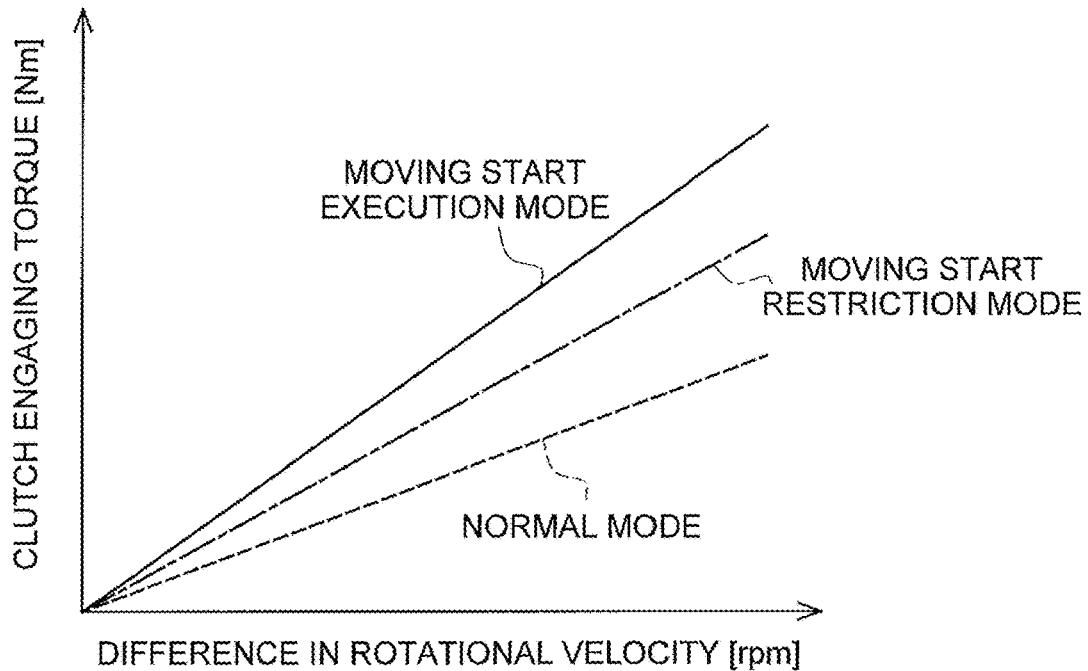
FIGS. 11A and 11B are charts showing clutch control during a moving start control according to a modified preferred embodiment of the present invention.
Figure 11B:
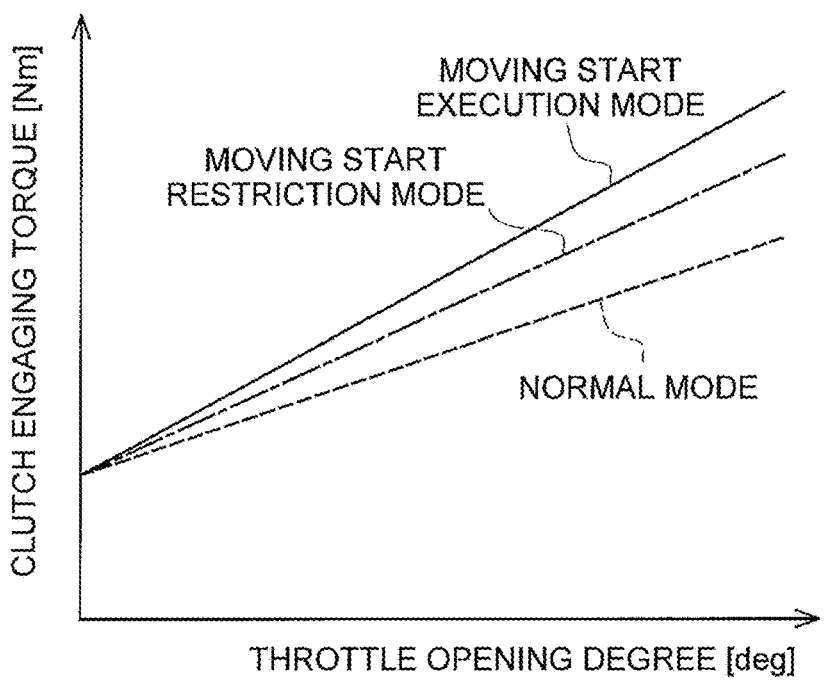
Figure 12:
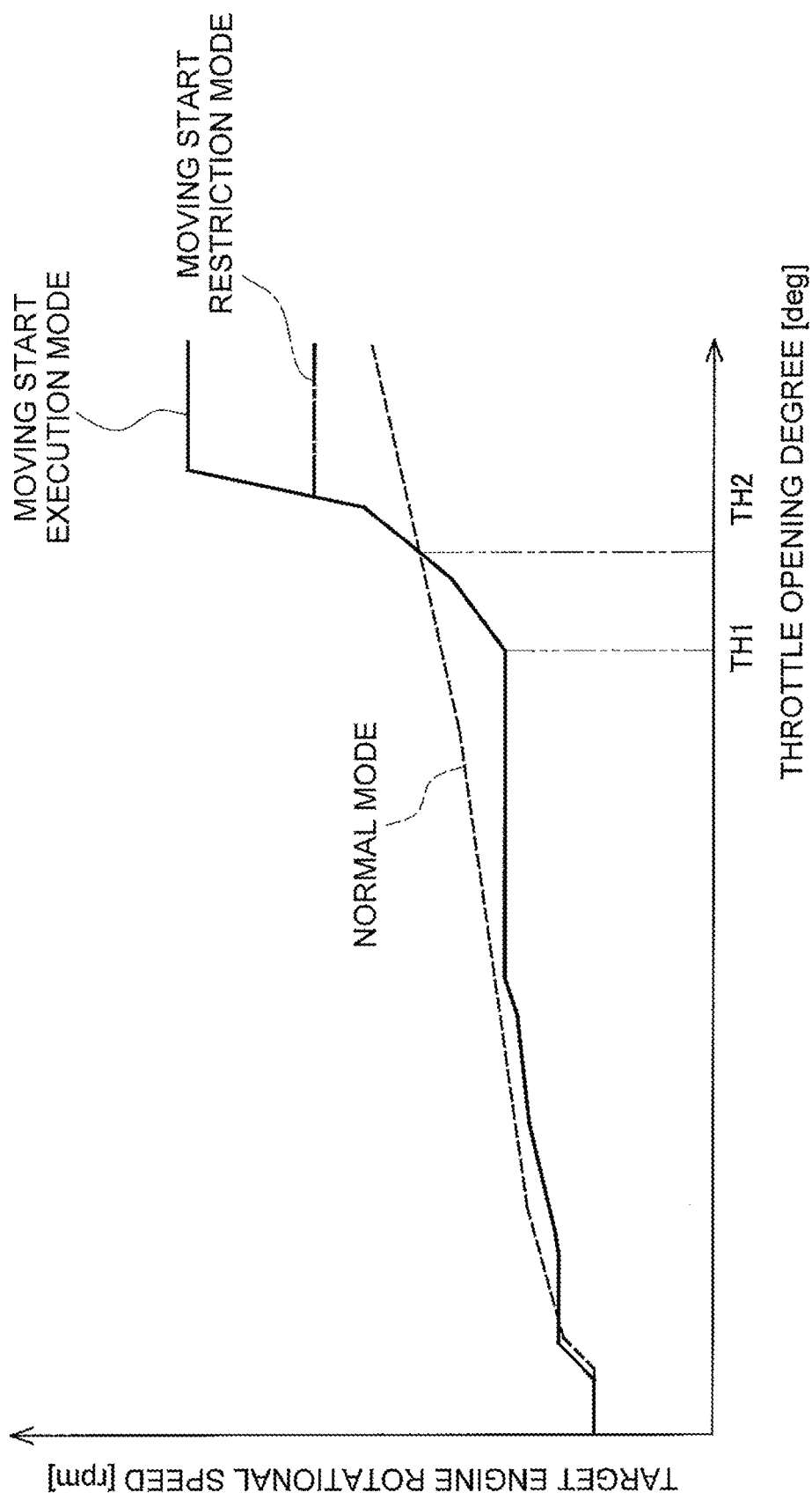
FIG. 12 is a chart showing engine control during a moving start control according to another modified preferred embodiment of the present invention.

In the moving start restriction mode, the driving force during the moving start control may be reduced without preventing the moving start control and then enabling the normal mode. For example, as shown in FIGS. 11A and 11B, in the moving start restriction mode, the engaging torque in the clutch 9 may be smaller than that in the moving start execution mode but may be larger than that in the normal mode. Alternatively, as shown in FIG. 12, in the moving start restriction mode, the target engine rotational speed at the second opening degree TH2 or greater may be less than that in the moving start execution mode but may be greater than that in the normal mode.

Figure 13A:
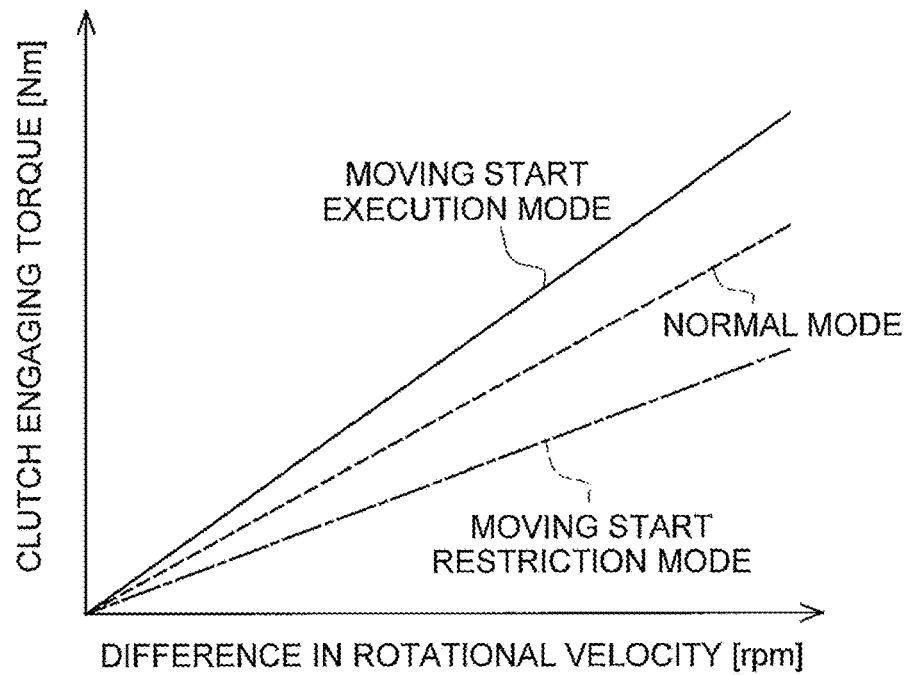
FIGS. 13A and 13B are charts showing clutch control during a moving start control according to yet another modified preferred embodiment of the present invention.
Figure 13B:
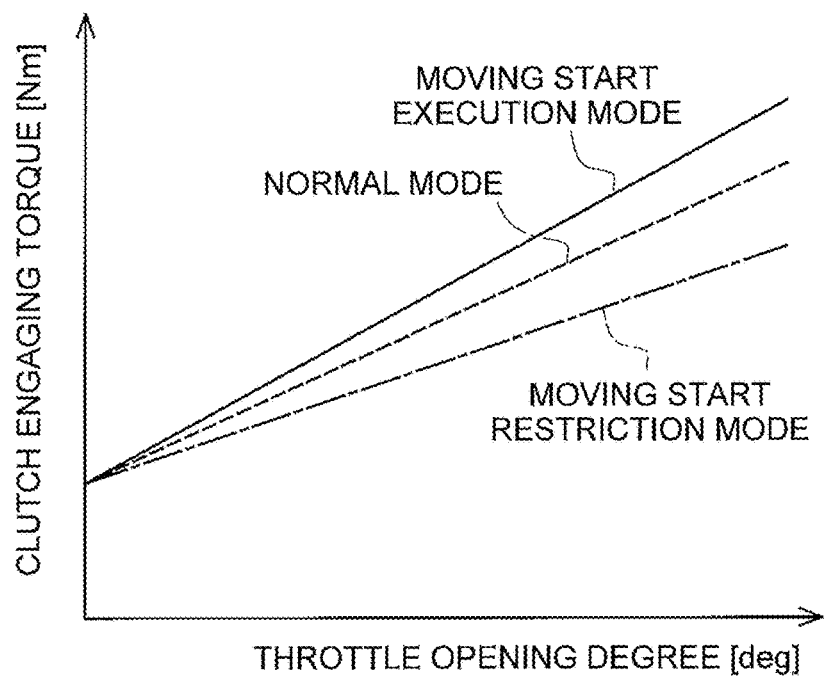
Figure 14:
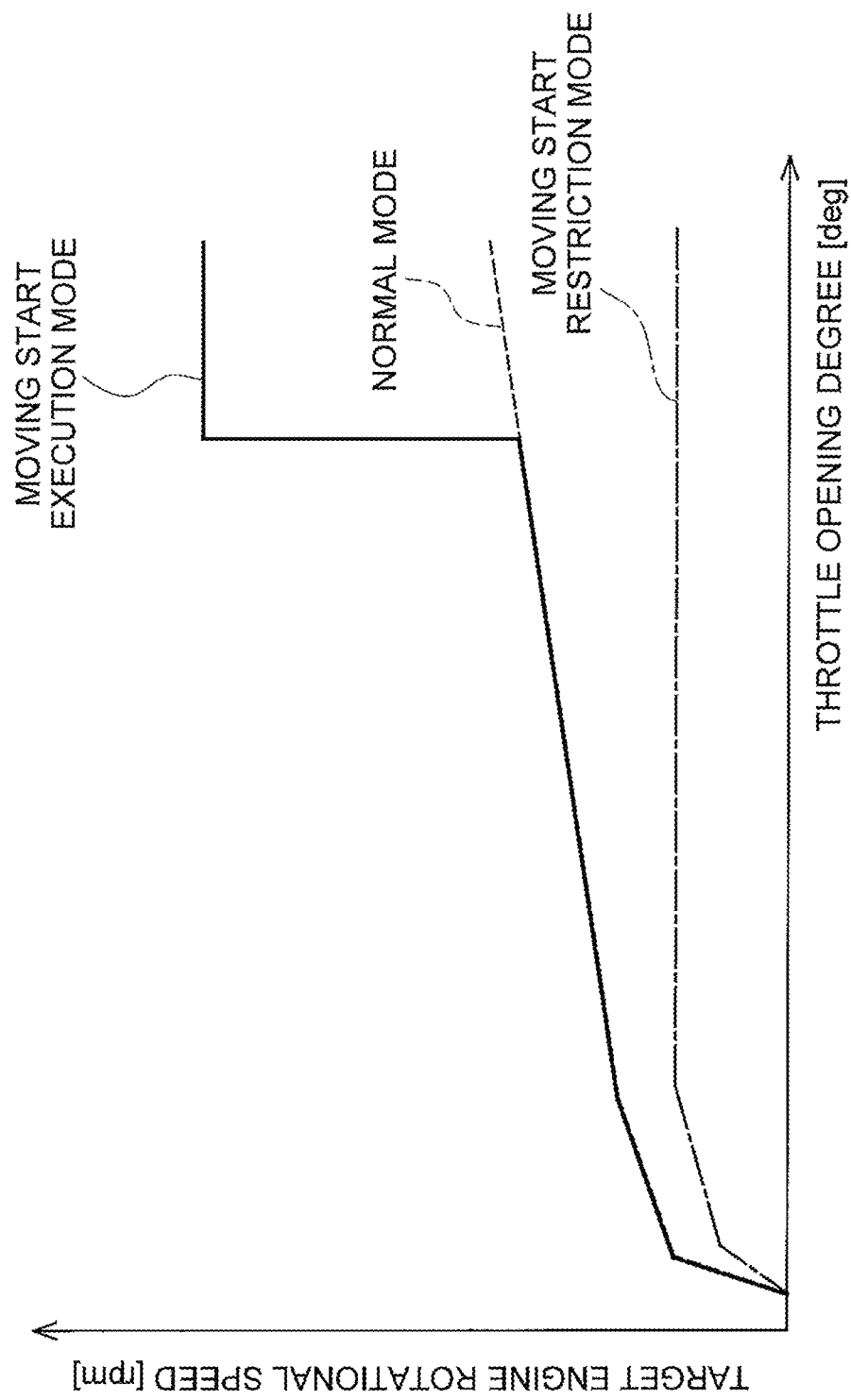
FIG. 14 is a chart showing engine control during a moving start control according to further yet another modified preferred embodiment of the present invention.

Yet alternatively, as shown in FIGS. 13A and 13B, in the moving start restriction mode, the engaging torque in the clutch 9 may be smaller than that in the moving start execution mode and that in the normal mode. Further yet alternatively, as shown in FIG. 14, in the moving start restriction mode, the target engine rotational speed may be less than that in the moving start execution mode and that in the normal mode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
    a prime mover;
    a pair of right and left wheels;
    a transmission including at least a high gear and a low gear, and that transmits a driving force of the prime mover to the pair of right and left wheels;
    a clutch provided in a power transmission path between the prime mover and the pair of right and left wheels; and
    a controller configured or programmed to execute a moving start control to increase the driving force of the prime mover during a moving start of the vehicle to be greater than that in a normal mode in which the moving start control is not executed by controlling an engaging force of the clutch; wherein
    the controller is configured or programmed to control the engaging force of the clutch during the moving start of the vehicle in accordance with which of the high gear and the low gear is selected in the transmission.

2. The vehicle according to claim 1, wherein, when the low gear is selected, the controller is configured or programmed to set the moving start control in a restricted state to prevent the moving start control or reduce the driving force of the prime mover during the moving start control.

3. The vehicle according to claim 2, wherein, when it is not decided which of the high gear and the lower gear is selected in the transmission, the controller is configured or programmed to set the moving start control in the restricted state.

4. The vehicle according to claim 2, further comprising:
    an operator that is able to be operated in a command state to instruct execution of the moving start control; wherein
    when the low gear is selected, the controller is configured or programmed to set the moving start control to the restricted state even if the operator is in the command state.

5. The vehicle according to claim 4, further comprising:
    a steering wheel; wherein
    the operator is adjacent to the steering wheel.

6. The vehicle according to claim 1, wherein the controller is configured or programmed to control a target rotational speed of the prime mover in accordance with which of the high gear and the low gear is selected.

7. The vehicle according to claim 6, wherein, when the low gear is selected, the controller is configured or programmed to decrease the target rotational speed of the prime mover more than when the high gear is selected.

8. The vehicle according to claim 1, wherein the controller is configured or programmed to change an engaging speed of the clutch in accordance with which of the high gear and the low gear is selected.

9. The vehicle according to claim 1, further comprising seats disposed in side-by-side arrangement.

10. The vehicle according to claim 1, further comprising a seat, wherein the prime mover is disposed behind the seat.

11. The vehicle according to claim 1, further comprising:
a seat; and
a steering wheel disposed in front of the seat.

12. The vehicle according to claim 1, further comprising:
a seat; and
a roll cage disposed above the seat.

13. A method of controlling a vehicle including a transmission including at least a high gear and a low gear, wherein the transmission transmits a driving force of a prime mover to a pair of right and left wheels, the method comprising:

determining which of the high gear and the low gear is selected in the transmission;

executing a moving start control to increase the driving force of the prime mover during a moving start of the vehicle to be greater than that in a normal mode in which the moving start control is not executed by controlling an engaging force of a clutch provided in a power transmission path between the prime mover and the pair of right and left wheels; and controlling the engaging force of the clutch during the moving start of the vehicle in accordance with which of the high gear and the lower gear is selected.

* * * * *